United States Patent [19]

Mandrin

[11] 4,271,665
[45] Jun. 9, 1981

[54] INSTALLATION FOR GENERATING PRESSURE GAS OR MECHANICAL ENERGY

[75] Inventor: Charles Mandrin, Winterthur, Switzerland

[73] Assignee: Sulzer Brothers Limited, Winterthur, Switzerland

[21] Appl. No.: 32,750

[22] Filed: Apr. 24, 1979

[30] Foreign Application Priority Data

Apr. 26, 1978 [CH] Switzerland .......................... 4491/78

[51] Int. Cl.³ .............................................. F02C 6/06
[52] U.S. Cl. .................................. 60/39.18 B; 60/39.5
[58] Field of Search ............... 60/39.18 B, 39.41, 39.5, 60/315, 39.12

[56] References Cited

U.S. PATENT DOCUMENTS

| | | | |
|---|---|---|---|
| 3,232,052 | 2/1966 | Ricard | 60/39.18 B |
| 3,868,817 | 3/1975 | Marion et al. | 60/39.12 |
| 4,121,912 | 10/1978 | Barber et al. | 60/39.12 |

FOREIGN PATENT DOCUMENTS 1149573  5/1963  Fed. Rep. of Germany .

Primary Examiner—James J. Gill
Attorney, Agent, or Firm—Kenyon & Kenyon

[57] ABSTRACT

An installation for producing compressed gas or mechanical energy contains an aircraft jet engine, the exhaust gases from which are used to heat a steam generator. A heat exchanger cools the exhaust gas to atmospheric temperature. The steam generator can provide steam for a steam turbine driving the compressor which compresses the exhaust gas to the final pressure. A gas turbine without a useful turbine or a second jet engine can be disposed between the heat exchanger and compressor and its exhaust gas can be used to heat a second steam generator. An additional heat exchanger cools the gas to atmospheric temperature and the compressor compresses it to the final pressure. The compressor can also comprise the compression stage of a gas turbine without a useful turbine or the compression stage of an aircraft jet engine having an expansion stage which drives a useful turbine producing mechanical energy. The expanded exhaust gas from the useful turbine can be used to supply heat for an additional steam generator.

13 Claims, 3 Drawing Figures

INSTALLATION FOR GENERATING PRESSURE GAS OR MECHANICAL ENERGY

This invention relates to an installation for generating pressure gas or mechanical energy.

As is known, pressure gas, consisting mainly of air and combustion products such as carbon dioxide and water vapor, is used in various applications. In one case, the pressure gas can be used as a raw material in the chemical industry, for example for ammonia production, for gasification of fuel, for jet production and for injection under pressure in oil fields and gas fields. In another case, the pressure gas can be used in a useful turbine in order to produce work upon expansion, for example in driving electrical generators, compressors and pumps.

In order to supply the chemical industry with pressure gas, it has been known to use air-compression installations which are comprised of a number of compressors in series. In such cases, air is compressed from atmospheric pressure to about 1,000 to 4,000 kpa. Usually, intermediate coolers are provided in order to avoid a reduction in the propulsive output as a result of excessive temperature. In order to drive the compressor, use has been made of drive units which include electric motors, steam turbines and gas turbines. In such installations, various losses are incurred such as the thermodynamic losses from the drive units and the thermodynamic losses from the compression processes.

Power plants have also been known which are based upon the open gas-turbine principle. In such cases, the Ericson process is aimed at in order to obtain maximum efficiency. As an approximate solution, "multi-shaft" gas-turbine installations have been constructed with a number of compressors in series, each with intermediate cooling and expansion into a number of turbines in series. In addition, a combustion chamber has been disposed downstream of each turbine in order to reheat the gases cooled by the preceeding expansion. Installations of this kind, however, are very complicated and are built only for special purposes.

In order to increase efficiency, the exhaust gases which are not under pressure or which are still very hot, have been used to heat a steam generator and to supply the produced steam to a steam turbine in order to produce additional power. This recovery of heat, however, has a serious disadvantage in that the pressureless exhaust gases have very low density and cause pressure losses which greatly reduce the efficiency of the gas turbine. The heat transfer between the exhaust gas and the heat exchangers is also very unfavorable.

Accordingly, it is an object of this invention to provide an installation for producing pressure gas or mechanical energy wherein heat is recovered from the exhaust gases at higher than atmosphere pressure.

It is another object of the invention to provide an installation for producing pressure gas or mechanical energy which utilizes heat exchangers of minimal size and wherein the negative effect of the pressure drop on turbine power is reduced.

Briefly, the invention provides an installation which is comprised of an aircraft jet-engine derived gas generator for intaking fresh air, a steam generator, a heat exchanger and a compressor. The gas generator is constructed with an expansion stage for exhausting a flow of hot combustion gases produced in the engine while the steam generator is connected to the engine so as to receive the flow of hot exhaust gas from the expansion stage as well as a flow of water in heat exchange relation therewith in order to generate a flow of steam from the water. The heat exchanger is disposed downstream of the same generator relative to the flow of exhaust gas and serves to cool the exhaust gas to near environmental temperature. The compressor is disposed downstream of the heat exchanger relative to the flow of exhaust gas in order to compress the cooled exhaust gas to a final pressure.

The compressor may be used to deliver a flow of compressed exhaust gas to a consumer or to a work turbine.

A steam turbine may also be connected to the steam generator in order to receive a flow of steam therefrom. In this case, the steam turbine may be drivingly connected to the compressor in order to drive the compressor or may be connected to a generator for producing work.

In one particular embodiment, the heat exchanger for cooling the exhaust gas exiting from the steam generator is in the form of a washing column.

In another embodiment, the installation may have a second like gas generator which receives a flow of cooled exhaust gas from the heat exchanger and which is constructed to produce and exhaust a second flow of hot combustion gases for subsequent delivery to the compressor. In this case, a second steam generator may be provided to generate a second flow of steam while cooling the second flow of hot exhaust gases. Likewise, a second heat exchanger may be employed downstream of this steam generator in order to cool the exhaust gas to near environmental temperature before passage of the exhaust gas to the compressor.

In still another embodiment wherein two gas generators are utilized with a combination of steam generators and at least one heat exchanger, the produced gas can be delivered to turbines which, in turn, generate work via suitable generators. As is known, an aircraft jet engine is a small, light, mass produced commercial unit which produces very large amounts of pressure gas in the form of exhaust gas. The pressure of the gas which is mainly air is about 300 to 350 kpa at a temperature of about 970° K. (Kelvin). The blading and combustion chambers of such engines are generally suitable for high output and temperature. In order to drive an aircraft, the pressure gas is expanded in a propelling nozzle. It is also known, however, to perform work by expanding the exhaust gas in a "useful" turbine which drives a mechanical load.

The invention is based on a further consideration that, if it is desired to produce pressure gas, the exhaust gas from the jet engine should not be expanded and subsequently recompressed. However, the exhaust-gas pressure of 300 to 350 kpa is not sufficient for most chemical processes. Accordingly, at least one additional compression stage is needed. Problems may also occur with the materials during compression since jet engine exhaust gas is very hot, i.e. about 970° K., and, more particularly, is much hotter than the exhaust gas from a useful turbine of a gas-turbine installation which is at approximately 723° to 773° K. The exhaust gas must therefore be cooled to approximately atmospheric temperature in order to save compression work. This has an advantage in that the heat exchange areas in an installation according to the invention can be small particularly when compared to exhaust gas which is cooled at atmospheric pressure. Conditions are therefore ideal for generating high pressure steam at a temperature of approximately 823° K., a temperature which as is known, is adequate for producing a steam circuit having an efficiency of about 35%. If the exhaust gas temperature is only about 723° to 773° K., the temperature of the generated steam is much lower and the efficiency of the known exhaust-gas heated steam circuit is limited to about 20 to 25%.

These and other objects and advantages of the invention will become more apparent from the following detailed description and appended claims taken in conjunction with the accompanying drawings in which:

Figure 1:
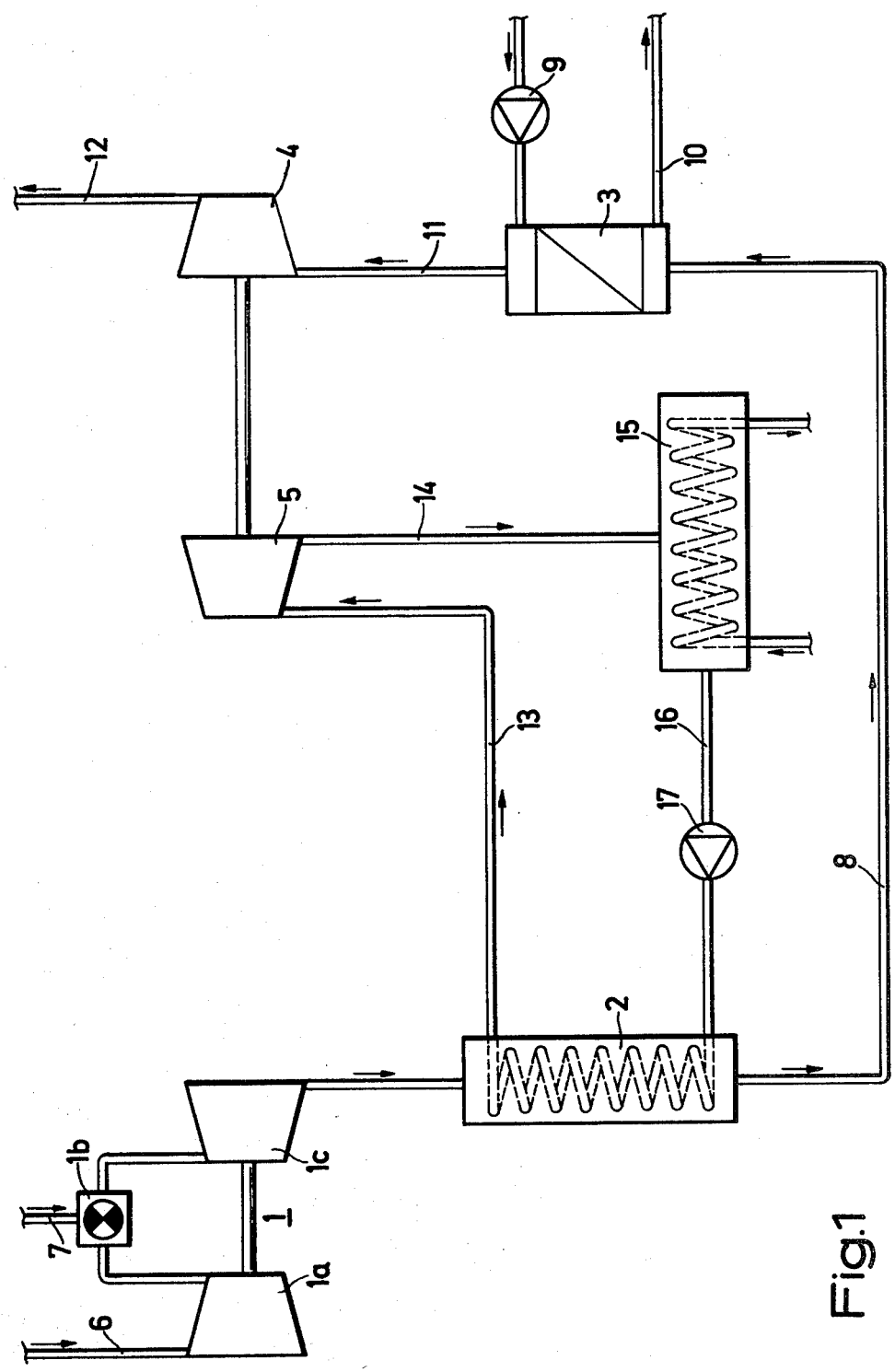
FIG. 1 illustrates an installation according to the invention for generating pressure gas.

The installation in FIG. 1, mainly comprises an aircraft jet engine 1 derivated gas generator 1, a steam generator 2, a heat exchanger in the form of a washing column 3, a compressor 4 and a steam turbine 5. In known manner, the gas generator 1 has a compression stage 1a, combustion chambers 1b, and an expansion stage 1c, which drives the compression stage 1a. The gas generator 1 is constructed in known manner to intake an excess of fresh air at atmospheric pressure through a pipe 6 while fuel is supplied to the combustion chambers 1b through a pipe 7. The expansion stage 1c of the gas generator exhausts flow of hot combustion gases (exhaust gas) which is produced to constitute the heating medium for the steam generator 2. The steam generator 2 is connected to the expansion stage 1c to receive the flow of hot exhaust gas as well as a flow of water in heat exchange relation therewith to generate a flow of steam while cooling the exhaust gas. The cooled exhaust gas flows through a pipe 8 to the washing column 3 and is cooled therein to near-environmental temperature (about room temperature) by spraying with water injected under pressure by a pump 9. The hot water left in the washing column 3 is discharged through a pipe 10.

The exhaust gas cooled in column 3 flows through a pipe 11 to the compressor 4 and is compressed to the final pressure and supplied through a pipe 12 to a chemical installation (not shown). The compressor 4 is driven by the steam turbine 5, which is supplied with steam from the steam generator 2 through a pipe 13.

The water-vapor expanded in the turbine 5 flows through a pipe 14 to a condenser 15 and is condensed therein. A pump 17 sucks the water of condensation through a pipe 16 and returns the water to the steam generator 2.

Of course, the compressor 4 can be associated with a separate drive means, in which case, the steam turbine 5 can be used as a drive means for other purposes.

Instead of using the washing column 3, the exhaust gas from the gas generator 1 can be cooled in another water or aircooled heat exchanger. It is preferable, however, to use a washing column since it has the advantage of a much better heat transfer between gas and water compared with other air or water cooled gas coolers, and therefore can be smaller. Furthermore, since the rapid cooling of the exhaust gas results in condensation of the water of combustion therein, particularly under high pressure, the gas cooler must be made of relatively expensive corrosion-resistant material. This is of less importance in the washing-column owing to its smaller dimensions.

NUMERICAL EXAMPLES OF AN INSTALLATION AS IN FIG. 1

In order to show that the installation according to the invention really does have the stated high efficiency, a numerical example of an installation will be given with the following data:

Gas Generator

Fresh-air intake pressure: 100 kpa (atmospheric). Air throughput 58 kg/s, intake temperature 228 K, exhaust-gas pressure 315 kpa, exhaust-gas temperature 906 K, fuel consumption 35, 870 kW.

Further details:

| | |
|---|---|
| Exhaust gas temperature after steam generator 2 | 373 K |
| Exhaust-gas temperature after washing/column 3 | 300 K |
| Final pressure of exhaust gas after compressor 4 | 1411 kpa |
| Regenerated heat in steam generator 2 | 32,460 kW |
| Efficiency of steam circuit | 35% |
| Shaft power of steam-turbine 5 = shaft power of compressor 4 | 11,360 kW |

If these numerical values are compared with a known compression installation comprising a first compressor having a pressure of 315 kpa and a propulsive output of 6,720 kW, an intermediate cooler and a second compressor having a pressure of 1,411 kpa and a propulsive output of 11,360 kW, i.e. a total of 18,080 kW for both compressors, the fuel consumption of the driving engine being 53,625 kW at 33% efficiency, the installation according to the invention has much lower fuel consumption, i.e. only 35,870 kW or 66%, for the same amount of gas compressed to the same final pressure of 1411 kpa.

Figure 2:
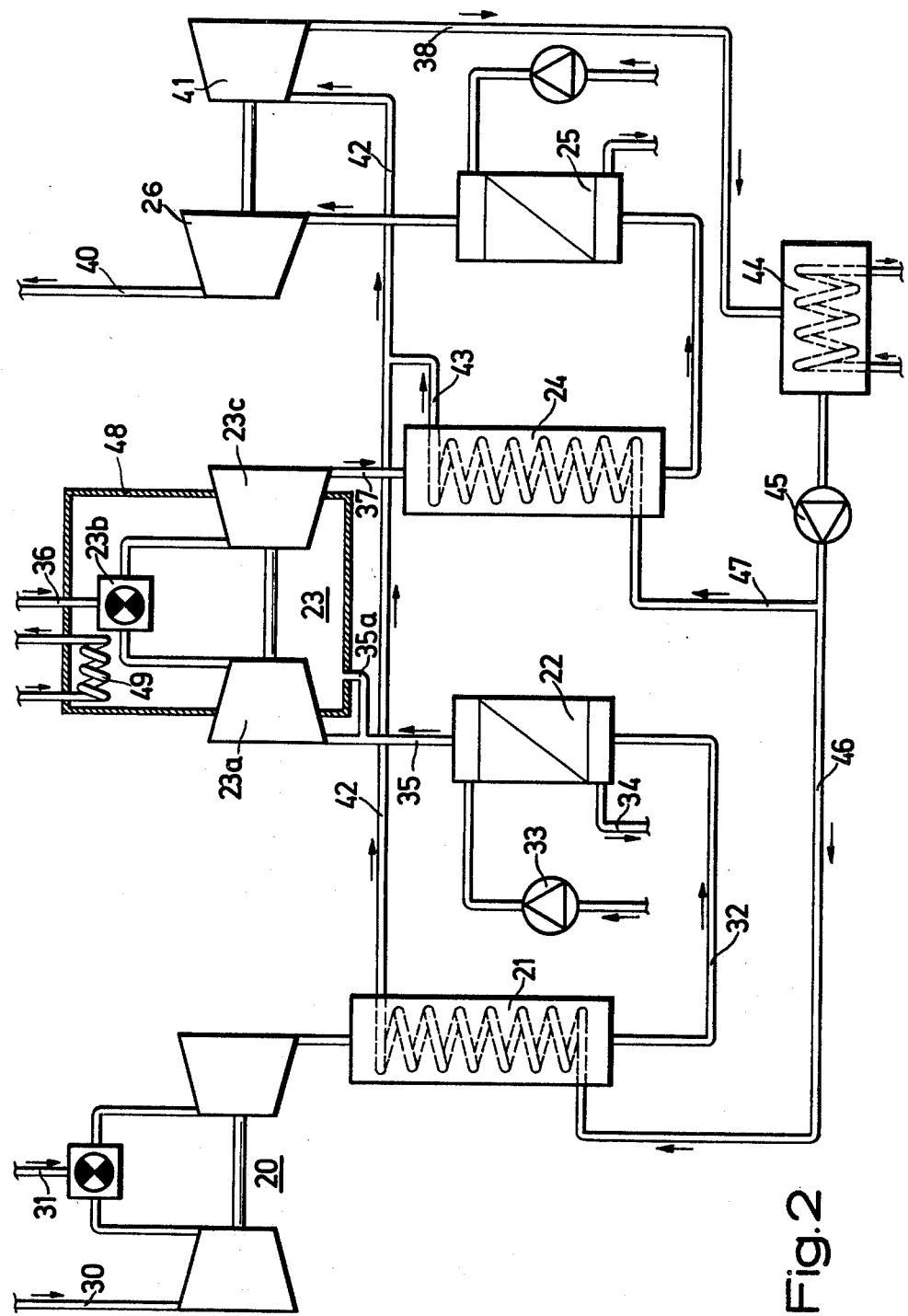
FIG. 2 illustrates a modified installation for producing pressure gas in accordance with the invention.

The final pressure of the installation depends on the output of the compressor 4 and the steam turbine 5. To obtain a higher final pressure, a second like gas generator can be disposed downstream of the steam generator 2 and washing-column 3. Since the exhaust gas from the second gas generator has to be cooled to near-atmospheric temperature, the heat from the exhaust gas can be used to generate steam. Since the exhaust-gas pressure is greater than that of the exhaust gas from the first gas generator, steam is generated under yet more favorable conditions. FIG. 2 shows an embodiment of an installation of this kind.

The installation in FIG. 2 mainly comprises an aircraft jet engine derived gas generator 20, a steam generator 21, a washing column 22, a second aircraft jet engine derivated gas generator 23, a second steam generator 24, a second washing column 25 and a compressor 26.

The first gas generator 20 intakes fresh air through a pipe 30 and fuel for the fuel chamber through a pipe 31. The exhaust gas produced in the gas generator 20 exhausts from the expansion stage and flows through the steam generator 21 and thence through a line 32 to the washing column 22, which is fitted with a cooling-water injection pump 33 and a hot-water discharge pipe 34. After being cooled, the exhaust gas flows through a pipe 35 to the compression stage 23a of the second gas generator 23 and is compressed therein. Fuel is supplied to combustion chambers 23b of the gas generator 23 through a pipe 36. The gas generator 23 also has an expansion stage 23c which exhausts a flow of hot exhaust gas through a pipe 37 to the second steam generator 24 and thence through a second washing-column 25 to the compressor 26, which compresses the cooled exhaust gas to the final pressure and supplies the gas through a pipe 40 to a load (not shown).

The compressor 26 is driven by a steam turbine 41 supplied with steam by the steam generator 21 through a line 42 and with steam by the steam generator 24 through a line 43. The water vapor which expands in the turbine 41 condenses in a condenser 44 and is drawn by a pump 45 so as to be supplied, in part, as feed water through a pipe 46 to the steam generator 21 and, in part, through a pipe 47 to the steam generator 24.

Calculations show that when using two gas generators 20, 23 similar to the gas generator 1 in the preceding example in FIG. 1, i.e. with a total fuel consumption $2 \times 35$, 870 kW = 71,740 kW and a final exhaust-gas pressure of 11,610 kpa in pipe 40, the total fuel consumption is only 65% of that of a compression installation of known construction driven by a gas turbine having an efficiency of 33%.

The steam from either steam generator 21 or 25 can be used for a purpose other than for driving the steam turbine 41.

Since the intake pressure of the gas generator 23 is greater than atmospheric pressure, the gas generator 23 is preferably strengthened by being encased in a housing 48 containing a gas having a pressure at least equal to the intake pressure of compression stage 23a. The pressure gas can be enclosed in the housing 48 or can be branched off through a branch line 35a from the exhaust gas in the intake line 35 of the gas generator 23 connected to the washing column 22. In both cases, the housing must be provided with a cooler 49 to cool the gas in the housing 48 in order to carry away radiation losses.

In the case of lower-power installations wherein the power required from the second gas generator 23 is so small that no suitable engine is commercially available, the gas generator can be replaced by a gas turbine, but without the normal useful turbine.

A third or other compression stages can be equipped with gas generators in the same manner as previously described. Preferably, however, the last stage is a compressor driven by a steam turbine, to make use of the generated steam.

The aforementioned two installations for generating pressure gas as in FIGS. 1 and 2 are based on reasoning which can also be applied to an installation for producing mechanical energy. To this end, the steam turbine 41 in the installation in FIG. 2 is not used for compressing exhaust gas (compressor 26) but for driving a useful load.

Figure 3:
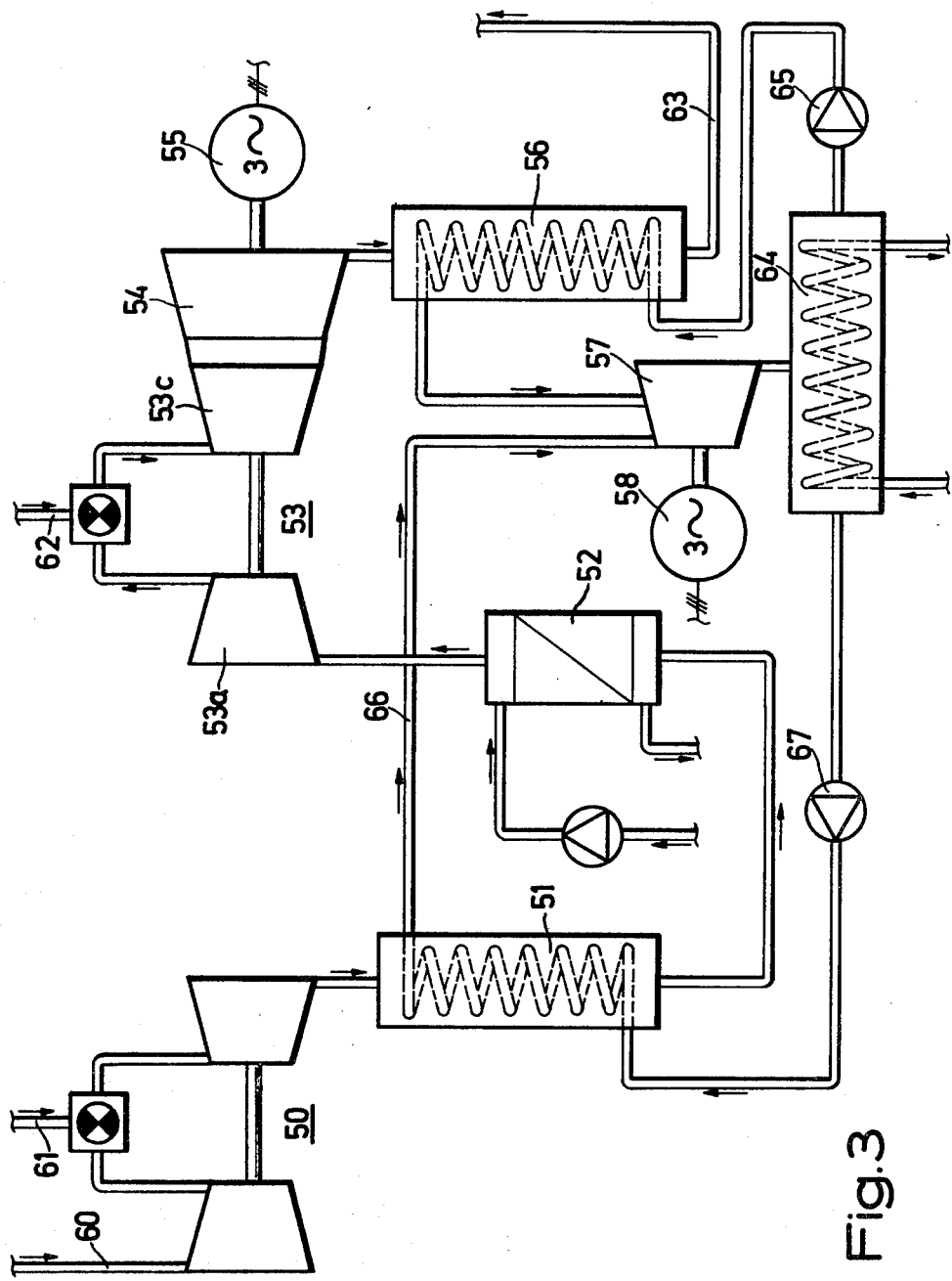
FIG. 3 illustrates an installation for generating mechanical energy in accordance with the invention.

Referring to FIG. 3, in order to generate mechanical energy, a useful-load drive unit can be made up of an aircraft jet engine derived gas generator associated with a useful-load turbine. As shown, the installation substantially comprises an aircraft jet engine derived gas generator 50, a steam generator 51, a washing column 52, a second aircraft jet engine derived gas generator 53, a useful turbine 54 comprising an electric generator 55, a second steam generator 56, a steam turbine 57 comprising an electric generator 58, and a condenser 64.

The gas generator 50 intakes fresh air through a pipe 60 and, fuel through a pipe 61. The exhaust gas leaving the gas generator 50 heats the steam generator 51 while being cooled and flows through the washing column 52 to be additionally cooled. The second gas generator 53 intakes and compresses exhaust gas from the washing column 52 while fuel chambers of the gas generator 53 are supplied with fuel through a pipe 62. The expanded gas is directly supplied to the useful turbine 54, which is incorporated in the gas generator 53 and drives the electric generator 55 to produce work. The exhaust gas, after being expanded in the useful turbine 54, is supplied to the steam generator 56 and cooled therein and then flows through a pipe 63 through a chimney (not shown). The steam generated in the generator 56 flows to the steam turbine 57 which drives the electric generator 58 to produce work. After expansion in the turbine 57, the expanded steam is condensed in a condenser 64. Some of the water of condensation is supplied by a pump 65 to the steam generator 56. The high pressure steam produced in generator 51 likewise flows through a pipe 66 to the steam turbine 57. The rest of the water of condensation in the condenser 64 is returned by a pump 67 to the steam generator 51.

In the present case, as in the case of the plant in FIG. 2, the second gas generator 53 can be replaced by a gas turbine without a useful turbine in the case of a small-capacity plant.

The term "aircraft jet engine" derivated gas generator has been used throughout to define an engine which is sometimes referred to as a "gas generator of jet unit construction" and which was previously referred to as "aircraft jet-engine derivated jet expander" when developed by Rolls-Royce in England.

What is claimed is:
1. An installation comprising
   a first gas generator having a compression stage for intaking fresh air, at least one combustion chamber and an expansion stage for driving said compression stage and exhausting a flow of hot combustion gases;
   a steam generator for receiving the flow of hot exhaust gas from said expansion stage and a flow of water in heat exchange relation therewith to generate a flow of steam from the flow of water;
   a heat exchanger downstream of said steam generator relative to the flow of exhaust gas to cool the exhaust gas to near-environmental temperature;
   a second gas generator having a second compression stage for receiving and compressing a flow of cooled exhaust gas from said heat exchanger, at least one combustion stage and an expansion stage for driving said second combustion stage and exhausting a second flow of hot exhaust gas;
   a second steam generator for receiving the second flow of hot exhaust gas from said second gas generator and a second flow of water in heat exchange relation therewith to generate a second flow of steam from the second flow of water;
   a second heat exchanger downstream of said second steam generator relative to the second flow of exhaust gas to cool the exhaust gas to near-environmental temperature;
   a compressor downstream of said second heat exchanger relative to the second flow of exhaust gas to compress the second cooled exhaust gas to a final pressure; and
   a steam turbine connected to at least one of said steam generators to receive a flow of steam therefrom and drivingly connected to said compressor.

2. An installation as set forth in claim 1 further comprising a housing encasing said second engine and having a gas therein at a pressure equal to the intake pressure of said compression stage of said second engine.

3. An installation as set forth in claim 2 further comprising a cooler in said housing for cooling the gas therein.

4. An installation as set forth in claim 2 further comprising a line between said first heat exchanger and said housing to deliver a part flow of the first flow of exhaust gas thereto.

5. An installation for generating mechanical energy comprising
- a first gas generator having a compression stage for intaking fresh air, at least one combustion stage and an expansion stage for driving said compression stage and exhausting a flow of hot combustion gases;
- a steam generator for receiving the flow of hot exhaust gas and a flow of water in heat exchange relation therewith to generate a flow of steam from the flow of water;
- a heat exchanger downstream of said steam generator relative to the flow of exhaust gas to cool the exhaust gas to near-environmental temperature;
- a second gas generator having a second compression stage for receiving and compressing a flow of cooled exhaust gas from said heat exchanger, at least one combustion stage and an expansion stage for driving said second compression stage and exhausting a second flow of hot exhaust gas, and
- a turbine connected to said second gas generator for receiving and expanding the second flow of hot exhaust gas therein to produce work.

6. An installation as set forth in claim 5 further comprising a second steam generator for receiving the second flow of exhaust gas from said turbine and a flow of water in heat exchange relation therewith to generate a second flow of steam from the flow of water, and a steam turbine connected to at least one of said steam generators to receive a flow of steam therefrom to produce work.

7. An installation comprising
- an aircraft jet-engine derived gas generator having a compression stage for taking in fresh air, at least one combustion stage and an expansion stage for driving said compression stage and exhausting hot exhaust gas therefrom;
- a steam generator for receiving the hot exhaust gas and water in heat exchange relation therewith to generate steam;
- a heat exchanger downstream of said steam generator to further cool the exhaust gas to near-environmental temperature;
- a second aircraft jet-engine derived gas generator having a second compression stage taking in cooled exhaust gas from said heat exchanger, at least one combustion stage and an expansion stage for driving said second compression stage and exhausting a second exhaust gas;
- a second steam generator downstream of said expansion stage of said second gas generator for receiving the second hot exhaust gas and water in heat exchange relation therewith to generate a second flow of steam;
- a second heat exchanger downstream of said second steam generator to further cool the exhaust gas to near-environmental temperature; and
- a compressor downstream of said second heat exchanger to compress the cooled exhaust gas to a final pressure.

8. An installation as set forth in claim 7 wherein said second gas generator is encased in a housing containing a gas, whose pressure corresponds to the intake pressure of said compression stage of said second gas generator.

9. An installation as set forth in claim 8 wherein said gas in said housing is branched off from the exhaust gas leaving said first heat exchanger.

10. An installation as set forth in claim 9 wherein said housing includes a cooler.

11. Installation as set forth in claim 7 wherein at least one of said heat exchangers is a washing column.

12. An installation comprising
- an aircraft jet-engine derived gas generator having a compression stage for taking in fresh air, at least one combustion stage and an expansion stage for driving said compression stage and exhausting hot exhaust gas therefrom;
- a steam generator for receiving the hot exhaust gas and water in heat exchange relation therewith to generate steam;
- a heat exchanger downstream of said steam generator to further cool the exhaust gas to near-environmental temperature;
- a second aircraft jet-engine derived gas generator having a second compression stage for taking in cooled exhaust gas from said heat exchanger, at least one combustion stage and an expansion stage for driving said compression stage and exhausting a second exhaust gas; and
- a turbine downstream of said second gas generator for receiving the second hot exhaust gas to produce work.

13. An installation as set forth in claim 12, further comprising a second steam generator for receiving the expanded second exhaust gas from said turbine and water in heat exchange relation therewith to generate a second steam, and a steam turbine connected to at least one of said steam generators to receive steam therefrom to produce work.

* * * * *

UNITED STATES PATENT AND TRADEMARK OFFICE
CERTIFICATE OF CORRECTION

PATENT NO. : 4,271,665
DATED : June 9, 1981
INVENTOR(S) : Charles Mandrin

It is certified that error appears in the above—identified patent and that said Letters Patent is hereby corrected as shown below:

Column 3, line 30, after "exhausts" insert --a--

Column 6, line 23, after "engine" delete " " ";

Line 24, after "tor" insert --"--

Signed and Sealed this

Twenty-ninth Day of September 1981

[SEAL]

Attest:

Attesting Officer

GERALD J. MOSSINGHOFF

Commissioner of Patents and Trademarks